G. M. WALKER.
BASKET.
APPLICATION FILED SEPT. 8, 1914.
1,272,324.
Patented July 9, 1918.
2 SHEETS—SHEET 1.
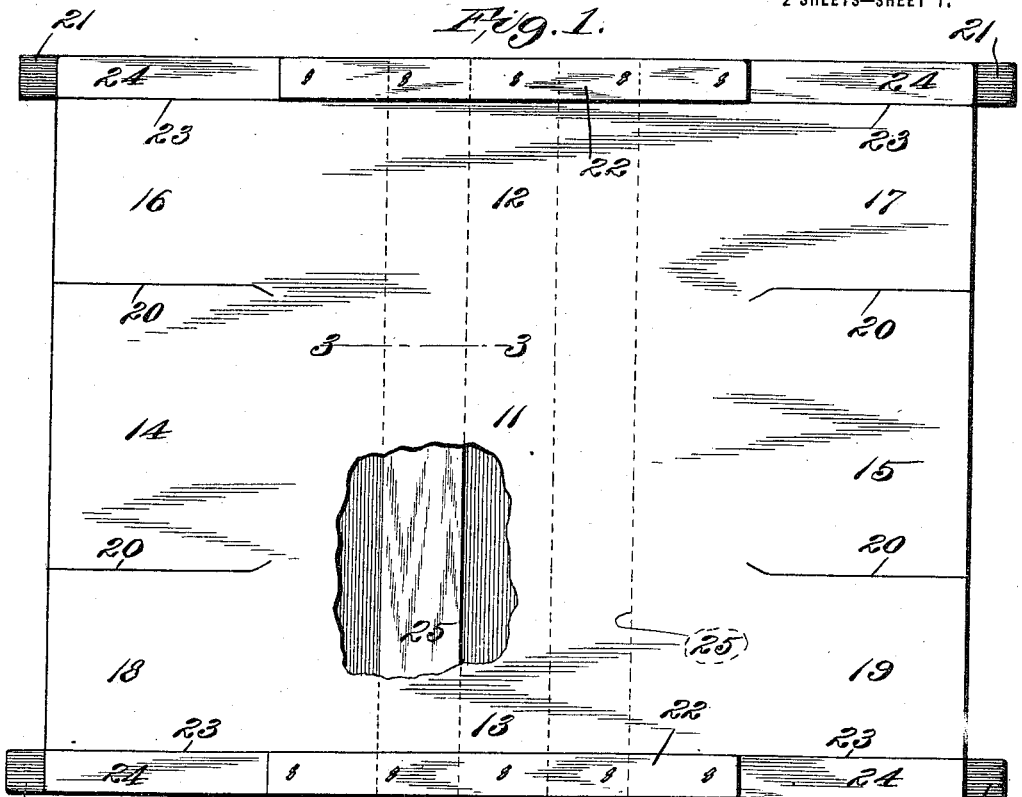
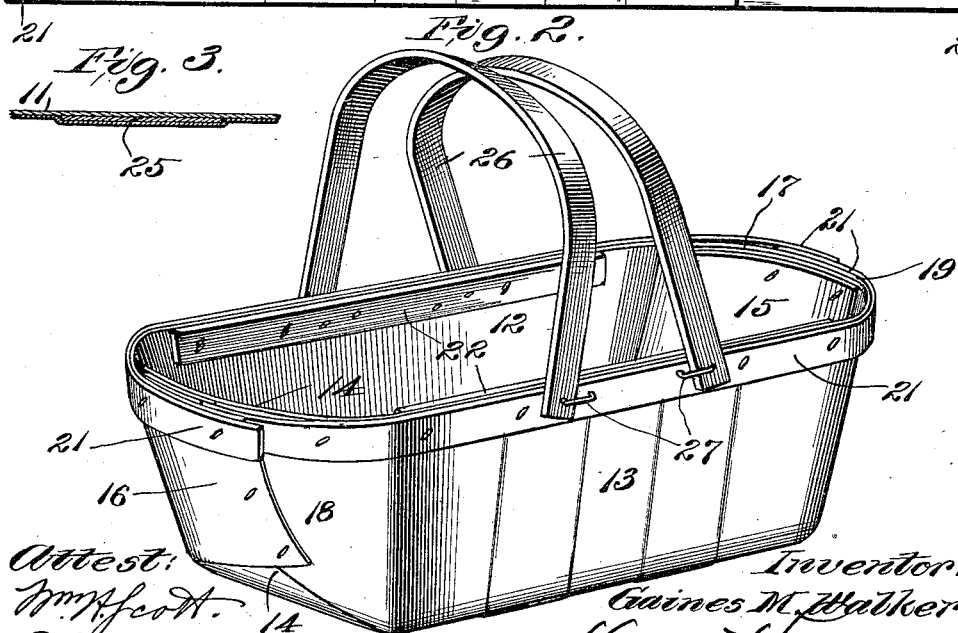

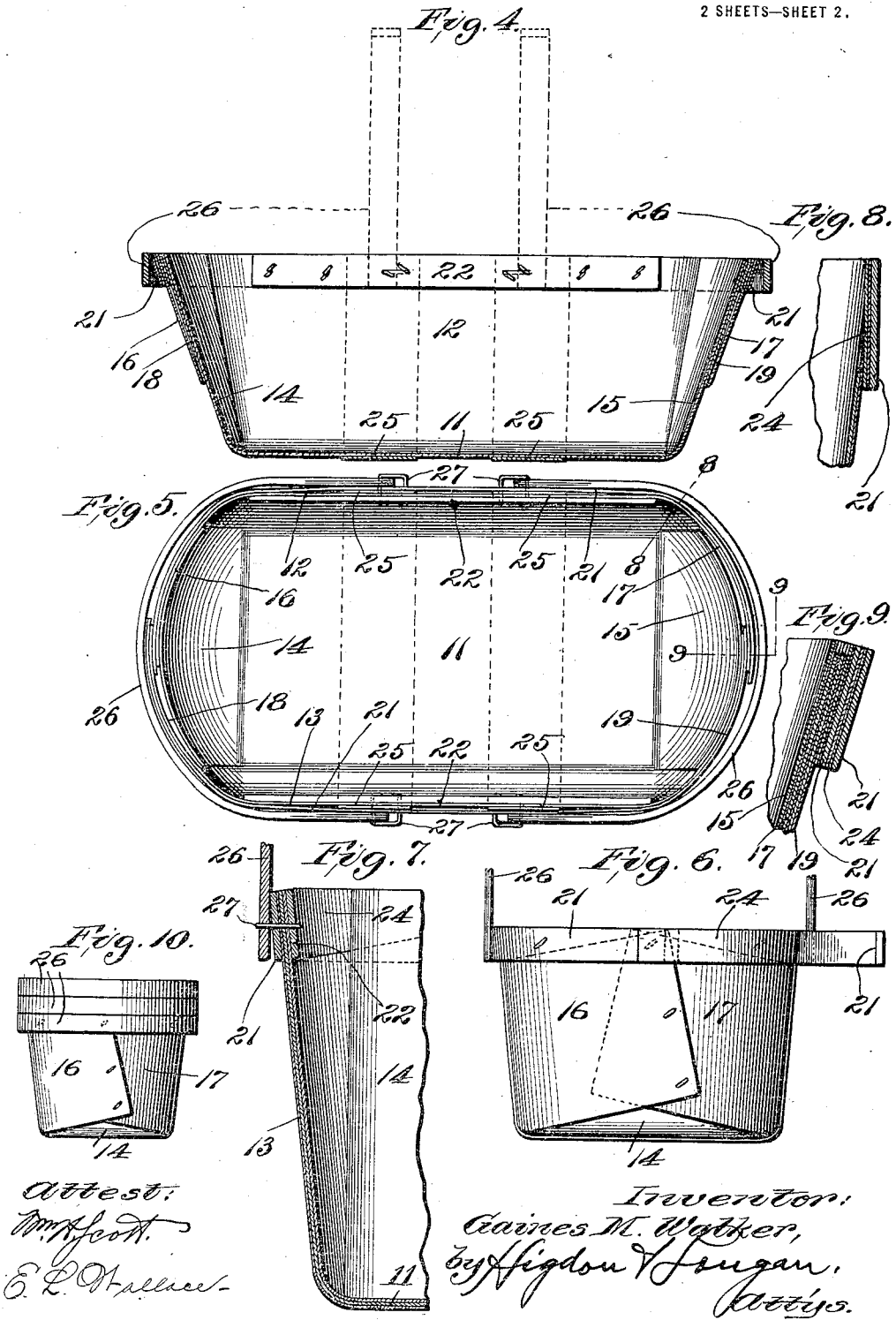

UNITED STATES PATENT OFFICE.

GAINES M. WALKER, OF ST. LOUIS, MISSOURI.

BASKET.

1,272,324.  Specification of Letters Patent.  Patented July 9, 1918.

Application filed September 8, 1914. Serial No. 860,584.

*To all whom it may concern:*

Be it known that I, GAINES M. WALKER, a citizen of the United States, and resident of St. Louis, Missouri, have invented certain new and useful Improvements in Baskets, of which the following is a specification containing a full, clear, and exact description, reference being had to the accompanying drawings, forming a part hereof.

My invention relates to improvements in baskets, in which there is a basket body, formed from a blank comprising a single piece of material, and which body has outwardly and upwardly flaring sides and ends; a rim around the entire upper margin of the body which does not stand outwardly away from the body at any point; a pair of handles pivotally connected with the rim to swing outwardly and overlie the rim at the basket ends; and reinforcing bands extending around the basket body from opposite points of handle attachment.

The object of my invention is to construct a cheap basket, capable of holding a maximum load when suspended, a basket having a rim around the entire upper margin, which hugs the body of the basket at all points to avoid objectionable outstanding rim portions which catch on other baskets and the like in handling or carrying, and also having a pair of hinged handles arranged to swing in opposite directions and to occupy positions overlying the rim at the ends of the basket for nesting.

With the above objects in view, my invention consists in certain novel details of arrangement and construction of parts hereinafter fully described, pointed out in my claims and illustrated by the accompanying drawings, in which—

Figure 1 is a plan of the blank from which the basket is formed; a portion being broken away to show the arrangement of one of the bands which reinforces the basket body between opposite points of handle attachment;

Fig. 2 is a perspective view of a complete basket;

Fig. 3 is a detail sectional elevation, taken on the line 3—3 of Fig. 1;

Fig. 4 is a longitudinal, sectional elevation, showing the handles folded for nesting;

Fig. 5 is a plan of the basket as shown in Fig. 4;

Fig. 6 is an end elevation showing one rim end unsecured;

Fig. 7 is an enlarged, fragmental, transverse sectional elevation of the basket at a point of handle attachment;

Fig. 8 is a fragmental, sectional elevation taken on the line 8—8 of Fig. 5; the handle not being shown;

Fig. 9 is a fragmental, sectional elevation taken on the line 9—9 of Fig. 5, the handle not being shown; and Fig. 10 is an end elevation, on a reduced scale, showing a number of baskets and their handles, nested.

Referring by numerals to the accompanying drawings, 11 designates the bottom of the basket, 12 and 13 the sides of the basket, 14 and 15 the basket ends, and 16, 17, 18 and 19 the auxiliary basket ends. These parts, just designated, are all constructed from a single blank (shown in Fig. 1), and by preference this blank is constructed of wood veneer and paper, the paper forming the outermost surface of the blank.

Leading from the end margins of the blanks are the cuts, or kerfs, 20, which separate the basket ends 14 and 15 from the auxiliary ends 16, 17, 18 and 19. The spacing apart of each pair of cuts or kerfs 20 is determined by the width of the bottom 11, and the length of each cut being determined by the height of the basket.

In order to minimize splitting of the material along the folding lines between the bottom and the two sides, the inner ends of the cuts are angularly disposed to the general trend of the cuts.

Along the side margins of the blank I secure to the outer face (the paper side) a strip 21, hereinafter referred to as the outer rim.

The numerals 23 designate cuts in the blank adjacent and paralleling the inner margins of the strips 21, which extend from the end margins of the blank to the outer ends of the strips 22, (the inner rims) in order to provide ribbons 24.

Extending transversely of the blank from one side margin to the other and located on either side of the transverse median line and disposed between the wood-veneer and paper are the bands 25, which serve to strengthen the sides and bottom at and between the points of suspension.

In forming the blank into basket shape, the sides 12 and 13 and the two basket ends 14 and 15 are all folded to stand at an angle relative to the bottom, the folding lines all being on gradual curves and not angular, in order that the basket body is not weakened at its folding lines, and said sides and ends incline outwardly and upwardly as in an ordinary "flaring" basket.

The auxiliary basket ends 16, 17, 18 and 19 are then folded to overlie the basket ends 14 and 15, the flare of the basket causing the upper margins of the auxiliary basket ends to incline upwardly from their inner, attached ends, which are in a plane beneath the upper margins of the basket sides, to points on each side of the transverse median line of the basket ends.

These overlapped auxiliary basket ends are then secured along their end margins, preferably by stapling, to the basket ends proper. The ribbons 24 are then folded, along with the ends of the outer rims 21, to overlie the upper margins of the basket ends, the ribbons and outer rim ends being drawn to engage the basket body at all points around its ends, so that the rim is free from outstanding portions and serves to build up the basket ends to parallel the basket sides over the inclined margins of the auxiliary basket ends.

The ribbons and rim ends are then stapled to the basket ends with their ends overlapped, which overlapping is possible, due to their having greater length than the auxiliary basket ends.

26 designates the basket handles, which are substantially semi-circular, and which are pivotally secured to the basket at spaced apart points along the upper margins of the basket sides in line with the bands 25, by staples 27, one leg only of which staples passes through the handle and through the outer and inner rims, while the other legs of the staples are passed through the inner and outer rims at points nearer the center of the basket and in planes beneath the legs extended through the handles, in order to "truss" the pivotal connection between the handles and basket, and in order that the handle ends may swing with respect to the staple legs.

The bands 25 are preferably made of wood veneer, glued on both faces and placed between the paper and wood of the basket body, the glue serving to stiffen and strengthen the bands as well as to hold them in place, that is against shifting relative to the basket body.

Having thus described my invention, what I claim as new therein and desire to secure by Letters-Patent of the United States therefore, is:

1. A basket constructed of a blank made from a single piece of wood veneer, covered with paper so that the same may be bent into basket form without disturbing the wood fiber and forming cracks, and comprising a bottom portion, integral sides and end portions, said end portions being formed by slitting the blank, the slits of each end converging toward each other, overlapping outer rim sections secured to the sides and ends of the basket, their ends being secured together, inner end sections of less length than the length of the basket, reinforcing strips disposed transversely of the basket and secured to the outer and inner rim sections, and handles bent to conform with the ends of the basket and pivotally secured to the inner and outer rim sections and to the ends of the reinforcing strips.

2. A basket constructed of a blank made from a single piece of wood veneer, covered with paper, comprising a bottom portion, integral sides and end portions, each end portion being composed of an inner end flap and two outer overlying end flaps, the same being formed by slitting each end of the blank with inwardly converging slits, so that when the outer flaps are folded over the inner end flaps, the inner edges of the outer end flaps will overlie the outer edges of the inner end flap, and the ends of the basket may be bent into outwardly curved form, overlapping rim sections having their ends secured together and to the sides, and outwardly curved ends, inner rim sections of less length than the basket, reinforcing strips disposed transversely of the basket and having their ends secured to the inner rim sections and to the outer rim sections, handles bent to conform to the rounded ends of the basket and pivotally secured to the inner and outer rim sections and to the ends of the transverse reinforcing strips.

3. A basket constructed of a blank made from a single piece of wood veneer, covered with paper, so that the same may be bent into basket form without disturbing the wood fiber, comprising a bottom portion, integral sides and ends, each end being outwardly curved and formed of an inner flap and two outside overlapping flaps, the inner edges of the overlapping flaps projecting beyond the inner edges of the inner flaps, overlapping outer rim sections secured to the sides and outwardly curved ends of the basket, inner reinforcing strips of less length than the length of the basket, transverse reinforcing strips disposed between the wood veneer and paper, and a pair of handles bent to conform to the outwardly curved ends of the basket, pivotally secured to the inner and outer rims and reinforcing strips.

In testimony whereof, I have signed my name to this specification, in presence of two subscribing witnesses.

GAINES M. WALKER.

Witnesses:
EDWARD E. LANGAN,
E. L. WALLACE.

Copies of this patent may be obtained for five cents each, by addressing the "Commissioner of Patents, Washington, D. C."